United States Patent
Hwang et al.

(10) Patent No.: US 8,036,297 B2
(45) Date of Patent: Oct. 11, 2011

(54) APPARATUS AND METHOD FOR SPACE-TIME CODING IN MULTIPLE-ANTENNA SYSTEM

(75) Inventors: In-Soo Hwang, Yongin-si (KR); Cheol-Woo You, Seoul (KR); Yung-Soo Kim, Seongnam-si (KR); Young-Ho Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 915 days.

(21) Appl. No.: 11/856,569

(22) Filed: Sep. 17, 2007

(65) Prior Publication Data

US 2009/0135939 A1 May 28, 2009

(30) Foreign Application Priority Data

Sep. 15, 2006 (KR) .............................. 2006-0089473

(51) Int. Cl.
*H04B 7/02* (2006.01)
(52) U.S. Cl. ...................................................... 375/267
(58) Field of Classification Search .................. 375/260, 375/265, 267, 299, 316, 346, 358; 455/500, 455/63.1, 101, 102, 132, 69; 370/334
See application file for complete search history.

(56) References Cited

U.S. PATENT DOCUMENTS

| Patent | Date | Inventor | Page |
|---|---|---|---|
| 6,298,092 B1 * | 10/2001 | Heath et al. | 375/267 |
| 7,315,817 B2 * | 1/2008 | Tasaki | 704/229 |
| 7,408,976 B1 * | 8/2008 | Narasimhan et al. | 375/148 |
| 7,616,695 B1 * | 11/2009 | Sarrigeorgidis | 375/260 |
| 7,623,441 B1 * | 11/2009 | Sampath et al. | 370/206 |
| 7,903,753 B2 * | 3/2011 | Lee et al. | 375/267 |
| 2005/0226343 A1 * | 10/2005 | Levy | 375/267 |
| 2006/0133521 A1 * | 6/2006 | Sampath et al. | 375/260 |
| 2007/0041457 A1 * | 2/2007 | Kadous et al. | 375/260 |
| 2007/0280373 A1 * | 12/2007 | Lee et al. | 375/267 |
| 2008/0144733 A1 * | 6/2008 | ElGamal et al. | 375/267 |

OTHER PUBLICATIONS

U.S. Appl. No. 60/803,340, filed May 26, 2006.*
Kyu Jong Hwang et al., "Adaptive Rate MIMO System Using Space-Time Block Mapping", Proceedings of 57th IEEE Semiannual Conference on Vehicular Technology, vol. 1, pp. 774-778, Apr. 2003.

* cited by examiner

*Primary Examiner* — Khanh C Tran
(74) *Attorney, Agent, or Firm* — The Farrell Law Firm, P.C.

(57) ABSTRACT

Disclosed is a space-time coding apparatus and method to flexibly adjust diversity/multiplexing orders in a multiple-antenna system. The transmitting apparatus for the multiple-antenna system includes a space-time code controller, an encoder, a demultiplexer, and a space-time encoder. The space-time code controller generates space-time codes by determining bases according to a multiplexing order required by a receiver. The encoder modulates and encodes data destined for the receiver in accordance with a predetermined modulation level. The demultiplexer demultiplexes data received from the encoder in order to transmit the data through at least one antenna. The space-time encoder space-time-codes the demultiplexed data using the space-time codes.

18 Claims, 5 Drawing Sheets

APPARATUS AND METHOD FOR SPACE-TIME CODING IN MULTIPLE-ANTENNA SYSTEM

PRIORITY

This application claims priority under 35 U.S.C. §119 to an application filed in the Korean Intellectual Property Office on Sep. 15, 2006, and assigned Ser. No. 2006-89473, the contents of which are incorporated herein by reference.

BACKGROUND OF THE INVENTION

1. Field of the Invention

The present invention relates generally to an apparatus and method for space-time coding in a multiple-antenna system, and, in particular, to a space-time coding apparatus and method for flexibly adjusting diversity/multiplexing orders in a multiple-antenna system.

2. Description of the Related Art

A variety of multimedia services for a wireless environment are demanded as the wireless mobile communication market continues its rapid growth. In addition, large-capacity data must be transmitted at a high speed in order to provide these multimedia services in wireless communication systems. Therefore, increasing attention is being drawn to a multiple-antenna system (e.g., a Multiple Input Multiple Output (MIMO) system) for increasing a data transmission rate using limited radio resources.

Compared to a single-antenna system, the multiple-antenna system can increase transmission reliability and a transmission rate without allocating additional frequencies or transmission power. That is, the multiple-antenna system can increase transmission reliability by achieving a diversity gain according to the number of transmitter/receiver (TX/RX) antennas, or can increase a transmission rate by simultaneously transmitting a plurality of signal sequences. Also, the multiple-antenna system can increase both the transmission reliability and the transmission rate using the hybrid scheme.

In order to achieve a lower error rate, the multiple-antenna system uses a space-time coding scheme that extends coding of the time domain to the space domain. In this context, the multiple-antenna system uses Alamouti space-time codes for obtaining a diversity effect and Bell Labs Layered Space-Time (BLAST) codes for obtaining a multiplexing effect. Also, the multiple-antenna system may use hybrid space-time codes for a trade-off between the diversity effect and the multiplexing effect.

A transmitter of the multiple-antenna system generates and stores space-time codes suitable for channel environments applicable to the multiple-antenna system. Based on channel information received from a corresponding receiver, the transmitter selects a space-time code, which is suitable for channel environments for providing a service to a receiver, in order to perform space-time coding.

This, however, complicates feedback information transmitted from the receiver to the transmitter and also wastes memory in the transmitter.

SUMMARY OF THE INVENTION

An object of the present invention is to substantially solve at least the above problems and/or disadvantages and to provide at least the advantages below. Accordingly, an object of the present invention is to provide a space-time coding apparatus and method for flexibly adjusting diversity/multiplexing orders in a multiple-antenna system.

Another object of the present invention is to provide a space-time coding apparatus and method to flexibly adjust diversity/multiplexing orders in a multiple-antenna system by using basis coefficients.

Still another object of the present invention is to provide a space-time coding apparatus and method for flexibly adjusting diversity/multiplexing orders in a multiple-antenna system by selecting, at a transmitter, basis coefficients according to the number of TX/RX antennas and a multiplexing order determined by a receiver.

According to one aspect of the present invention, a transmitting apparatus for a multiple-antenna system includes a space-time code controller for generating space-time codes by determining bases according to a multiplexing order required by a receiver; an encoder for modulating and encoding data destined for the receiver in accordance with a predetermined modulation level; a demultiplexer for demultiplexing data received from the encoder in order to transmit the data through at least one antenna; and a space-time encoder for space-time-coding the demultiplexed data using the space-time codes.

According to another aspect of the present invention, a receiving apparatus for a multiple-antenna system includes a receiver for receiving a signal from a transmitter; a channel estimator for estimating a channel using the received signal; and a multiplexing order determiner for determining a multiplexing order according to the channel estimate and transmitting the determined multiplexing order to the transmitter.

According to still another aspect of the present invention, a transmitting method for a multiple-antenna system using space-time codes includes detecting a multiplexing order required by a receiver; determining bases according to the detected multiplexing order; and performing space-time-coding on TX symbols using space-time codes generated using the bases.

According to even another aspect of the present invention, a receiving method for a multiple-antenna system using space-time codes includes determining if a signal is received from a transmitter; if the signal is received from the transmitter, estimating a channel using the received signal; and determining a multiplexing order using the estimated channel information and transmitting the determined multiplexing order to the transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for performing space-time coding in a multiple-antenna system by flexibly adjusting diversity/multiplexing orders according to channel environments. When space-time codes are used in common in the multiple-antenna system, the diversity/multiplexing orders are adjusted by adjusting the basis number according to channel environments. The basis number according to the channel environments is determined by a multiplexing order and the number of transmitter/receiver (TX/RX) antennas. A basis is a linearly independent spanning set, and hereinafter, more than one basis will be referred to as "bases".

The common space-time codes may be generated using linear dispersion codes that can be expressed by the sum and difference of matrixes where diversity codes and multiplexing codes are dispersed linearly. However, the linear dispersion codes cannot provide a high transmission rate because the minimum distance between codes converges on zero as the spectral efficiency increases. Therefore, perfect space-time codes based on cyclic division algebra may be used as the common space-time codes.

The following description will be made on the assumption that each of a transmitter and a receiver in the multiple-antenna system has two antennas. The multiple-antenna system may adjust diversity/multiplexing orders of space-time codes according to the number of bases.

An Alamouti code, used here as a typical diversity code, can be expressed as Equation (1):

$$S = \begin{bmatrix} s_1 & s_2 \\ -s_2^* & s_1^* \end{bmatrix} = \begin{bmatrix} \alpha_1 + j\beta_1 & \alpha_2 + j\beta_2 \\ -\alpha_2 + j\beta_2 & \alpha_1 - j\beta_1 \end{bmatrix} \quad (1)$$
$$= \alpha_1 \begin{bmatrix} 1 & 0 \\ 0 & 1 \end{bmatrix} + \alpha_2 \begin{bmatrix} 0 & 1 \\ -1 & 0 \end{bmatrix} + j\beta_1 \begin{bmatrix} 1 & 0 \\ 0 & -1 \end{bmatrix} + j\beta_2 \begin{bmatrix} 0 & 1 \\ 1 & 0 \end{bmatrix}$$

where S denotes an Alamouti code, $s_i$ denotes the $i^{th}$ TX symbol, $\alpha_i$ denotes a real value of the $i^{th}$ TX symbol, $\beta_i$ denotes an imaginary value of the $i^{th}$ TX symbol, $$\begin{bmatrix} 1 & 0 \\ 0 & 1 \end{bmatrix} \text{ and } \begin{bmatrix} 0 & 1 \\ -1 & 0 \end{bmatrix}$$

denote real bases, and $$\begin{bmatrix} 1 & 0 \\ 0 & -1 \end{bmatrix} \text{ and } \begin{bmatrix} 0 & 1 \\ 1 & 0 \end{bmatrix}$$

imaginary bases.

As expressed in Equation (1), the transmitter transmits a symbol $s_1$ and a symbol $s_2$ through the first antenna and the second antenna during a first time period, and transmits a symbol $-s_2^*$ and a symbol $s_1^*$ through the first antenna and the second antenna during a second time period.

Figure 5:
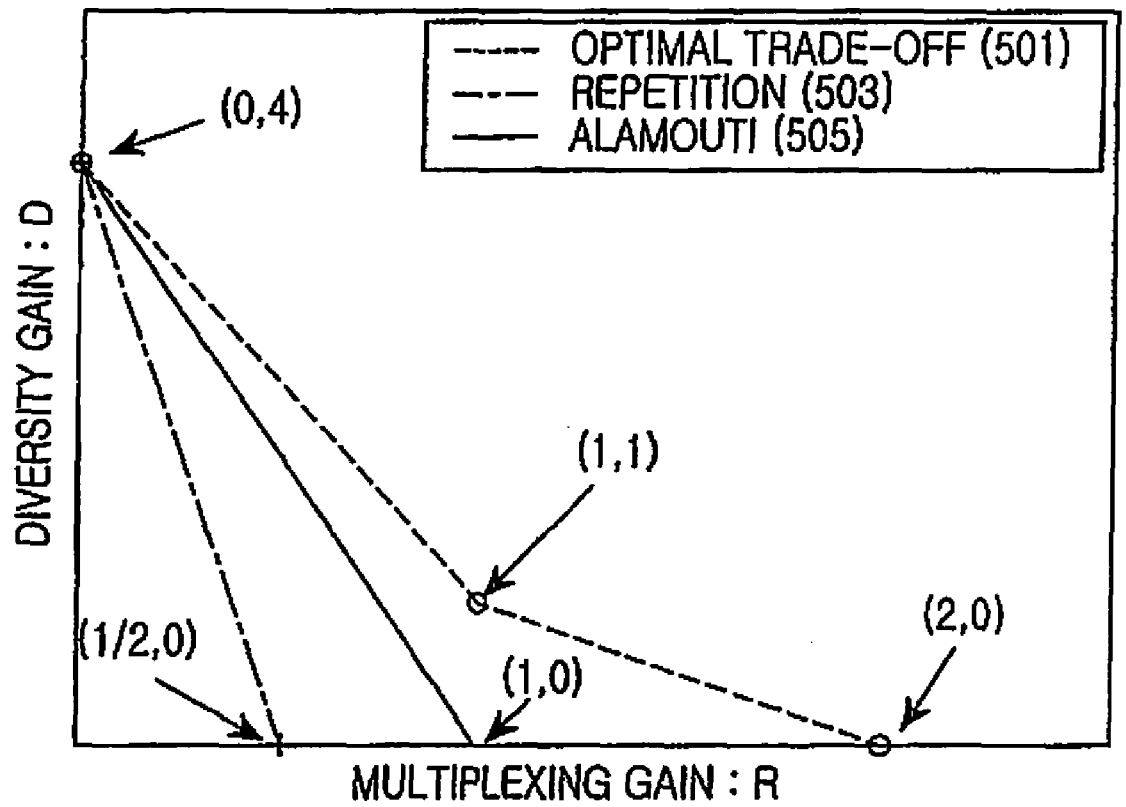
FIG. 5 is a graph illustrating the performance of diversity/multiplexing orders according to an embodiment of the present invention.

When the transmitter uses the Alamouti code, it can achieve the maximum diversity gain as illustrated as "Alamouti (505)" in FIG. 5. However, because the transmitter has a transmission rate of 1 which is derived from 2 (the number of TX symbols)/2(TX time periods), it transmits two complex symbols during two time periods using two real bases and two imaginary bases. That is, the transmitter cannot achieve the maximum multiplexing gain of the half of a transmission rate 2 that can be obtained by transmitting 4 symbols during 2 time periods in a 2×2 multiple-antenna system.

A BLAST code, which is used here as a typical multiplexing code, can be expressed as Equation (2):

$$A_{M(\tau-1)+m} = B_{M(\tau-1)+m} = \xi_\tau \eta_m^1, \tau=(1,\ldots,T), m=(1,\ldots,M) \quad (2)$$

where A denotes a real basis in the BLAST code, B denotes an imaginary basis in the BLAST code, T denotes the number of TX antennas, M denotes the number of RX antennas, $\xi$ denotes a T-dimensional column vector where only the $\tau^{th}$ element is 1 and the remaining elements are 0, and $\eta$ denotes a M-dimensional column vector where only the $m^{th}$ element is 1 and the remaining elements are 0.

When the transmitter uses the BLAST code, it can achieve the maximum multiplexing gain. In the case of a 2×2 multiple-antenna system, both of T and M are 2 in Equation (2). Because there are 8 bases (A=4, B=4), the transmitter can achieve the optimal multiplexing gain according to the optimal transmission rate.

As expressed in Equations (1) and (2), the number of bases varies with the space-time codes used by the transmitter. That is, the number of bases for the diversity code is different from the number of bases for the multiplexing code.

Therefore, the space-time codes expressed in Equations (1) and (2) can be expressed by one equation as Equation (3):

$$X_{2\times 2} = \sum_{i=1}^{S} \mu_i A_i$$

where $A_i$ denotes the $i^{th}$ basis of the space-time code, $\mu$ denotes coefficients of TX symbols (e.g., $\alpha_i$ and $\beta_i$ in Equation (1)), and i denotes the number of bases of the space-time code (e.g., 4 for the Alamouti code and 8 for the BLAST code).

FIG. 5 is a graph illustrating the performance of diversity/multiplexing orders according to an embodiment of the present invention. In the graph of FIG. 5, the abscissa denotes a multiplexing gain (i.e., a multiplexing order) and the ordinate denotes a diversity gain (i.e., a diversity order). As illustrated in FIG. 5, the diversity order is inversely proportional to the multiplexing order.

When the transmitter uses the common space-time codes according to the present invention, it can achieve the optimal diversity gain and the optimal multiplexing gain according to the number of bases as illustrated in an optimal trade-off curve 501 of FIG. 5. The optimal trade-off curve 501 can be expressed as Equation (4):

$$d=(N-r)(M-r) \quad (4)$$

where d denotes a diversity order, N denotes the number of TX antennas, M denotes the number of RX antennas, and r denotes a multiplexing order.

For example, if the multiplexing order r is 0, the diversity order has the maximum value (d=NM). If the multiplexing order r has a small value among TX/RX antennas, the diversity order is 0.

When the transmitter uses the Alamouti code, it can achieve the optimal diversity gain as illustrated in the Alamouti curve 505 of FIG. 5. However, when using the Alamouti code, the transmitter cannot achieve the optimal multiplexing gain because it transmits symbols using only 4 bases among the maximum available 8 bases for the 2×2 multiple-antenna system.

The transmitter can achieve the optimal multiplexing gain using 4 additional bases (2 real bases and 2 imaginary bases) and the 4 bases in Equation (1).

For example, the transmitter can generate space-time codes for the maximum diversity gain and the maximum multiplexing gain by using the 4 bases in Equation (1) and 4 additional bases $$\left(\text{e.g., } \gamma\begin{bmatrix}1 & 0\\0 & 1\end{bmatrix}, \gamma\begin{bmatrix}0 & 1\\-1 & 0\end{bmatrix}, \gamma\begin{bmatrix}1 & 0\\0 & -1\end{bmatrix}, \gamma\begin{bmatrix}0 & 1\\1 & 0\end{bmatrix}\right),$$

as expressed in Equation (5):

$$S_1 = \alpha_1\begin{bmatrix}1 & 0\\0 & 1\end{bmatrix} + \alpha_2\begin{bmatrix}0 & 1\\-1 & 0\end{bmatrix} + j\beta_1\begin{bmatrix}1 & 0\\0 & -1\end{bmatrix} + j\beta_2\begin{bmatrix}0 & 1\\1 & 0\end{bmatrix} \quad (5)$$

$$= \begin{bmatrix}s_1 & s_2\\-s_2^* & s_1^*\end{bmatrix}$$

$$S_2 = \gamma\left(\alpha_3\begin{bmatrix}1 & 0\\0 & -1\end{bmatrix} + \alpha_4\begin{bmatrix}0 & 1\\1 & 0\end{bmatrix} + j\beta_3\begin{bmatrix}1 & 0\\0 & 1\end{bmatrix} + j\beta_4\begin{bmatrix}0 & 1\\-1 & 0\end{bmatrix}\right)$$

$$= \gamma\begin{bmatrix}s_3 & s_4\\s_4^* & -s_3^*\end{bmatrix}$$

$$S = \begin{bmatrix}s_1 & s_2\\-s_2^* & s_1^*\end{bmatrix} + \gamma\begin{bmatrix}s_3 & s_4\\s_4^* & -s_3^*\end{bmatrix} = \begin{bmatrix}s_1+\gamma s_3 & s_2+\gamma s_4\\-s_2^*+\gamma s_4^* & s_1^*-\gamma s_3^*\end{bmatrix}$$

where $s_i$ denotes the $i^{th}$ TX symbol, $\alpha_i$ denotes a real value of the $i^{th}$ TX symbol, $\beta_i$ denotes an imaginary value of the $i^{th}$ TX symbol, and $$\begin{bmatrix}1 & 0\\0 & 1\end{bmatrix}, \begin{bmatrix}0 & 1\\-1 & 0\end{bmatrix}, \begin{bmatrix}1 & 0\\0 & -1\end{bmatrix}, \begin{bmatrix}0 & 1\\1 & 0\end{bmatrix},$$

$$\gamma\begin{bmatrix}1 & 0\\0 & 1\end{bmatrix}, \gamma\begin{bmatrix}0 & 1\\-1 & 0\end{bmatrix}, \gamma\begin{bmatrix}1 & 0\\0 & -1\end{bmatrix}, \gamma\begin{bmatrix}0 & 1\\1 & 0\end{bmatrix}$$

denote bases.

The transmitter can achieve the maximum multiplexing gain of a transmission rate '2' because the transmitter transmits 4 symbols during 2 time periods by adding 4 bases to the Alamouti code. At this point, the transmitter may use 8 bases by adjusting the coefficients of the bases of the Alamouti code.

Hereinafter, a description is provided of transmitter and receiver configurations, for adjusting the diversity/multiplexing orders of the space-time codes by adjusting the number of bases according to channel environments. The following description will be made on the assumption that the transmitter determines the number of bases according to a multiplexing order received from the receiver.

Figure 1:
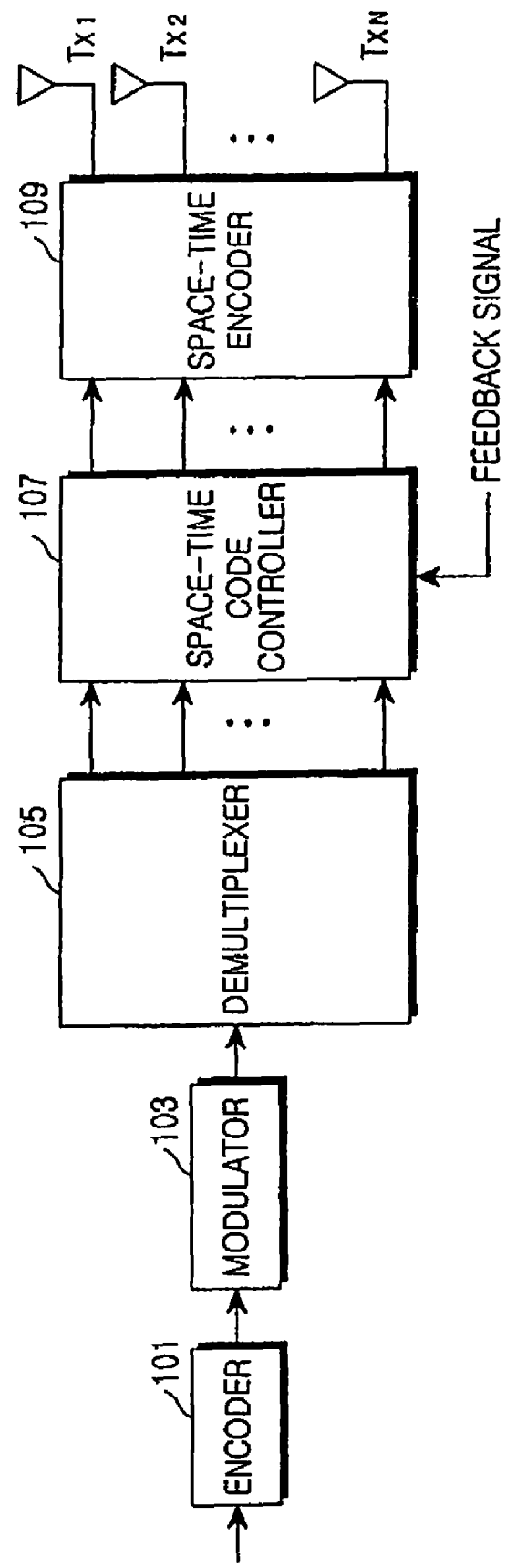
FIG. 1 is a block diagram of a transmitting apparatus for a multiple-antenna system according to the present invention.

FIG. 1 is a block diagram of a transmitting apparatus for the multiple-antenna system according to the present invention. Referring to FIG. 1, the transmitting apparatus includes an encoder 101, a modulator 103, a demultiplexer (DEMUX) 105, a space-time code controller 107, and a space-time encoder 109.

The encoder 101 encodes a TX information bit stream in accordance with a predetermined modulation level (e.g., a Modulation and Coding Scheme (MCS) level) to output the coded symbols.

The modulator 103 modulates the coded symbols from the encoder 101 in accordance with a predetermined modulation level (e.g., an MCS level). That is, the modulator 103 outputs complex signals by performing signal mapping on the constellation according to a predetermined mapping scheme.

The demultiplexer 105 demultiplexes the complex signals from the modulator 103 for transmission through N number of TX antennas.

The space-time code controller 107 determines the number of bases according to a multiplexing order included in feedback information received from the receiver. Although not illustrated in FIG. 1, the space-time code controller 107 includes a multiplexing order detector, a basis determiner and a space-time code generator. The multiplexing order detector detects a multiplexing order required by the receiver. For example, the multiplexing order detector detects a multiplexing order included in the feedback information received from the receiver.

The basis determiner stores a basis table according to a multiplexing order and the number of TX/RX antennas. Because the basis determiner knows the number of TX/RX antennas, the basis determiner selects bases for space-time codes using the multiplexing order received from the receiver. For example, if a multiplexing order is received from the receiver in the 2×2 multiple-antenna system, the basis determiner determines the bases for the space-time codes by calculating the number of necessary bases using Equation (6):

$$B = (TX_{MAX} \times 2)/(SM_{MAX}/SM) \quad (6)$$

where B denotes the number of bases, $TX_{MAX}$ denotes the maximum number of symbols transmissible in the multiple-antenna system, $SM_{MAX}$ denotes the maximum multiplexing order, and SM denotes a received multiplexing order.

For example, if the transmitter receives a multiplexing order '1' from the receiver in the 2×2 multiple-antenna system, the basis determiner selects 4 (=(4×2)/(2/1)) bases according to Equation (6). If the transmitter receives a multiplexing order '2' from the receiver, the basis determiner selects 8 (=(4×2)/(2/2)) bases according to Equation (6). At this point, the transmitter may generate 8 bases by adjusting the coefficients of 4 bases.

The space-time code generator generates space-time codes using the bases selected by the basis determiner.

The space-time encoder 109 space-time-codes the data symbols from the demultiplexer 105 using the space-time codes from the space-time code controller 107, and transmits the encoded data through the corresponding antennas.

Figure 2:
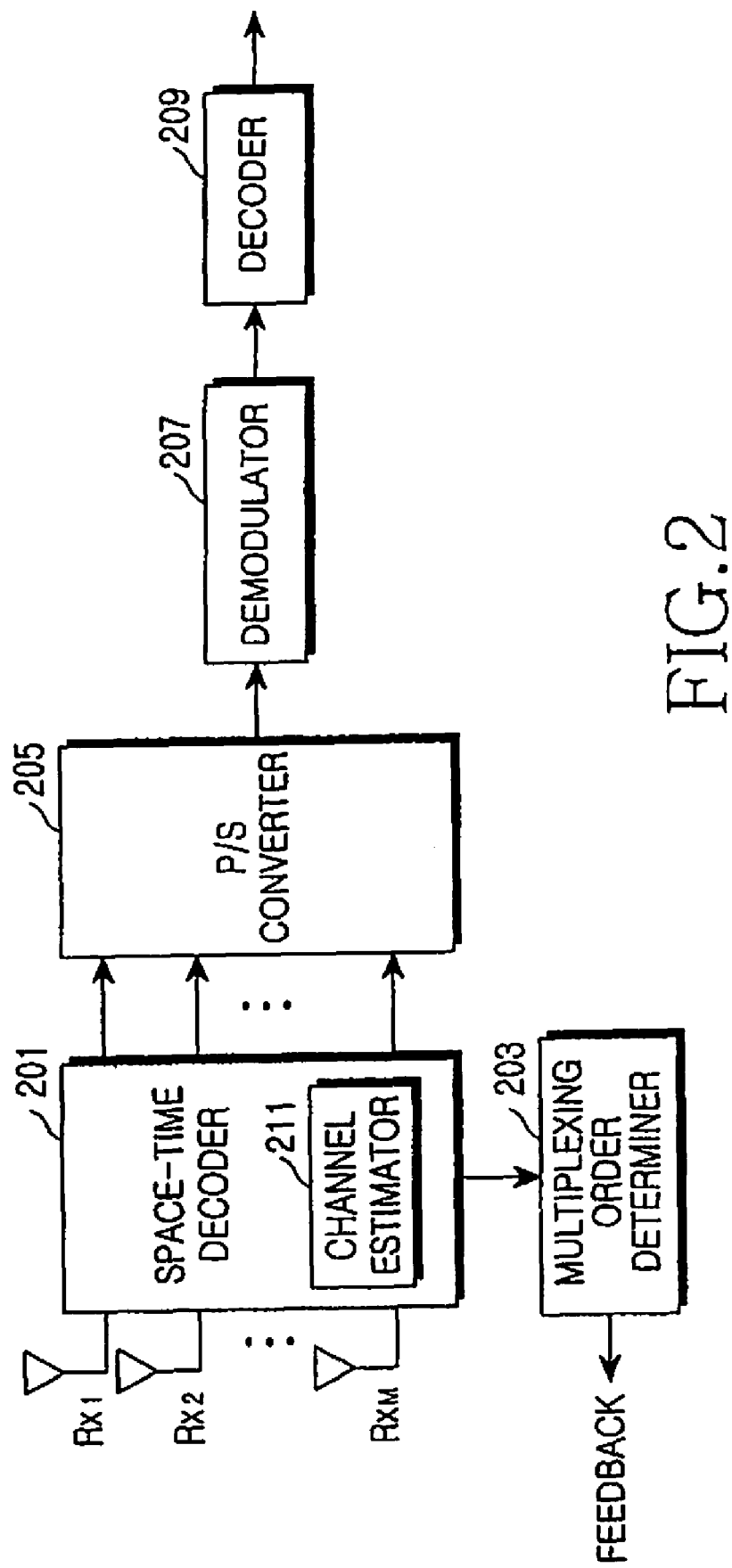
FIG. 2 is a block diagram of a receiving apparatus for the multiple-antenna system according to the present invention.

FIG. 2 is a block diagram of a receiving apparatus for the multiple-antenna system according to the present invention. Referring to FIG. 2, the receiving apparatus includes a space-time decoder 201, a multiplexing order determiner 203, a parallel-to-serial (P/S) converter 205, a demodulator 207, and a decoder 209.

The space-time decoder 201 calculates Euclidean distances for all sequences transmissible from the transmitter by using an RX vector of signals received through the RX antennas. The space-time decoder 201 outputs an information bit stream corresponding to the minimum Euclidean distance among the calculated Euclidean distances as RX frame data. The space-time decoder 201 includes a channel estimator 211 for estimating a pilot signal received through the corresponding antenna.

The multiplexing order determiner 203 determines, using the channel estimate from the channel estimator 211, a multiplexing order according to a transmission rate required by the receiver, and feeds the determined multiplexing order back to the transmitter. For example, the multiplexing order determiner 203 calculates the multiplexing order using a ratio of the required transmission rate to the channel estimate.

The P/S converter 205 converts parallel data received from the space-time decoder 201 into serial data.

The demodulator 207 demodulates data received from the P/S converter 205 in accordance with a predetermined modulation level (e.g., an MCS level). The decoder 209 decodes the demodulated data received from the demodulator 207 in accordance with a predetermined modulation level, thereby recovering information data.

Figure 3:
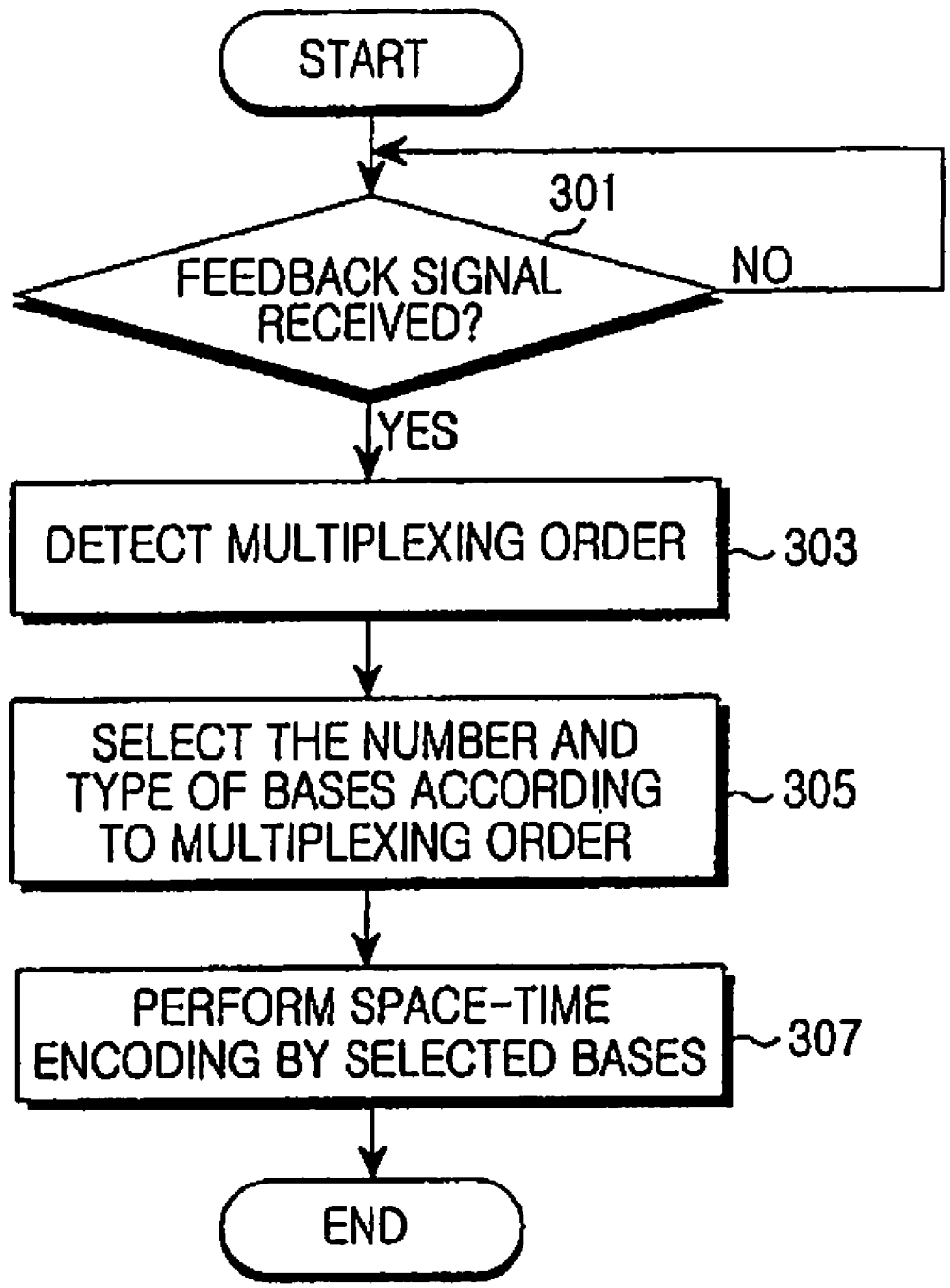
FIG. 3 is a flowchart illustrating a transmitting procedure for the multiple-antenna system according to an embodiment of the present invention.

FIG. 3 is a flowchart illustrating a transmitting procedure for the multiple-antenna system according to an embodiment of the present invention. Referring to FIG. 3, in step 301, the transmitter determines if feedback signal is received from the receiver. If so, the transmitting procedure proceeds to step 303; and, if not, the transmitting procedure repeats step 301.

In step 303, the transmitter detects a multiplexing order included in the received feedback signal.

In step 305, the transmitter determines bases for space-time codes according to the detected multiplexing order. The transmitter stores a basis table considering the multiplexing order and the number of TX/RX antennas. According to the multiplexing order received from the receiver, the transmitter calculates the number of bases for space-time codes using Equation (6) and selects necessary bases from the basis table. For example, if a multiplexing order '1' is fed back from the receiver in the 2×2 multiple-antenna system, the transmitter selects 4 (=(4×2)/(2/1)) bases. If a multiplexing order '2' is fed back from the receiver, the transmitter selects 8 (=(4×2)/(2/2)) bases. At this point, the transmitter may generate 8 bases by adjusting the coefficients of 4 bases according to Equation (5).

In step 307, the transmitter generates space-time codes according to the selected bases and performs space-time coding on a TX data symbol to be transmitted.

Thereafter, the transmitting procedure ends.

Figure 4:
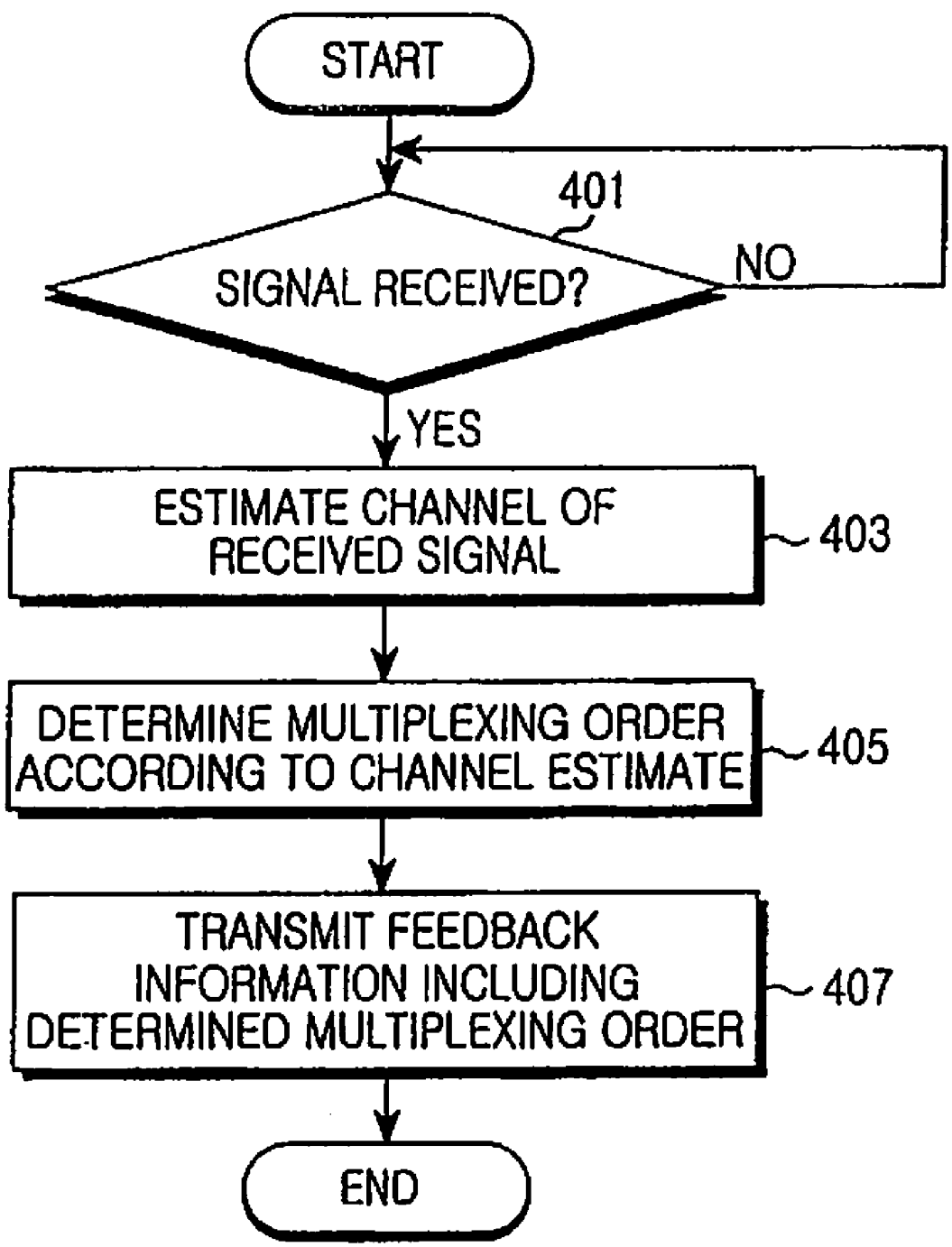
FIG. 4 is a flowchart illustrating a receiving procedure for the multiple-antenna system according to an embodiment of the present invention.

FIG. 4 is a flowchart illustrating a receiving procedure for the multiple-antenna system according to an embodiment of the present invention.

Referring to FIG. 4, in step 401, the receiver determines if a signal is received from the transmitter. If so, the receiving procedure proceeds to step 403; and, if not, the receiving procedure repeats step 401.

In step 403, the receiver estimates a channel using a pilot signal included in the received signal.

In step 405, the receiver determines a multiplexing order according to the channel estimate. For example, the receiver determines the multiplexing order using the ratio of the required transmission rate to the channel estimate.

In step 407, the receiver feeds the determined multiplexing order back to the transmitter.

Thereafter, the receiving procedure ends.

In the above embodiment, the transmitter selects bases for space-time codes by receiving the multiplexing order determined at the receiver according to a channel state. In another embodiment, the receiver transmits channel state information to the transmitter, and the transmitter selects bases for space-time codes by determining a multiplexing order corresponding to the received channel state information.

As described above, the present invention performs space-time coding in the multiple-antenna system by using space-time codes capable of flexibly adjusting the diversity/multiplexing orders according to the number of bases. The feedback amount can be reduced by adjusting the space-time codes flexibly according to channel environments and adjusting the number of bases according to the multiplexing order. Also, a waste of memory can be reduced by adjusting the space-time codes using the bases according to channel environments, without storing the space-time codes according to channel environments.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitting apparatus for a multiple-antenna system, the apparatus comprising:
   a space-time code controller for generating space-time codes using bases for the space-time codes that are selected according to a detected multiplexing order required by a receiver;
   an encoder for modulating and encoding data destined for the receiver in accordance with a predetermined modulation level;
   a demultiplexer for demultiplexing data received from the encoder to transmit the data through at least one antenna; and
   a space-time encoder for space-time-coding the demultiplexed data using the space-time codes.

2. The transmitting apparatus of claim 1, wherein the space-time code controller comprises:
   a multiplexing order detector for detecting a multiplexing order required by the receiver;
   a basis determiner for selecting bases according to the multiplexing order; and
   a space-time code generator for generating space-time codes using the bases.

3. The transmitting apparatus of claim 2, wherein the multiplexing order detector detects a multiplexing order included in feedback information received from the receiver.

4. The transmitting apparatus of claim 2, wherein the multiplexing order detector determines the multiplexing order using channel state information included in feedback information received from the receiver.

5. The transmitting apparatus of claim 2, wherein the basis determiner selects bases corresponding to the multiplexing order required by the receiver from a basis table including bases according to the multiplexing order and a number of transmission/reception antennas.

6. The transmitting apparatus of claim 2, wherein the space-time code generator includes common space-time codes and transforms the common space-time codes according to the bases selected by the basis determiner.

7. The transmitting apparatus of claim 6, wherein the common space-time codes are one of linear dispersion codes and perfect space-time codes.

8. The transmitting apparatus of claim 1, further comprising a transmitter for transmitting the space-time coded symbol to the receiver.

9. A receiving apparatus for a multiple-antenna system, the receiving apparatus comprising:
   a receiver for receiving a signal from a transmitter;
   a channel estimator for estimating a channel using the received signal; and
   a multiplexing order determiner for determining a multiplexing order according to the channel estimate and transmitting the determined multiplexing order to the transmitter for selection of bases of space-time codes, according to the multiplexing order, for generating space-time codes by transforming common space-time codes according to the bases, and for performing spacetime-coding on symbols, for transmission to the receiver, using the generated space-time codes.

10. The receiving apparatus of claim 9, wherein the multiplexing order determiner determines the multiplexing order according to the channel estimate, a necessary number of reception antennas, and a transmission rate required by the receiving apparatus.

11. A transmitting method for a multiple-antenna system using space-time codes, the method comprising:
   detecting, at a transmitter, a multiplexing order required by a receiver;
   selecting bases of space-time codes, according to the detected multiplexing order;
   generating space-time codes by transforming common space-time codes according to the bases; and
   performing space-time-coding on transmission symbols using the generated space-time codes.

12. The transmitting method of claim 11, wherein the step of detecting the multiplexing order comprises:
   determining if feedback information is received from the receiver; and
   if the feedback information is received from the receiver, detecting the multiplexing order included in the received feedback information.

13. The transmitting method of claim 11, wherein the step of detecting the multiplexing order comprises:
   determining if feedback information is received from the receiver;
   if feedback information is received from the receiver, detecting channel state information included in the received feedback information; and
   determining the multiplexing order using the detected channel state information.

14. The transmitting method of claim 11, wherein the step of determining the bases comprises selecting bases corresponding to the multiplexing order required by the receiver from a basis table including bases according to the multiplexing order and a number of transmission/reception antennas.

15. The transmitting method of claim 11, wherein the common space-time codes are one of linear dispersion codes and perfect space-time codes.

16. The transmitting method of claim 11, further comprising transmitting the space-time coded symbol to the receiver.

17. A receiving method for a multiple-antenna system using space-time codes, the method comprising:
   determining if a signal is received from a transmitter;
   if the signal is received from the transmitter, estimating a channel using the received signal; and
   determining a multiplexing order using information about the estimated channel and transmitting the determined multiplexing order to the transmitter for selection of bases of space-time codes, according to the multiplexing order, for generating space-time codes by transforming common space-time codes according to the bases, and for performing space-time-coding on symbols, for transmission to a receiver, using the generated space-time codes.

18. The receiving method of claim 17, wherein the multiplexing order is determined according to the channel estimate, a necessary number of reception antennas, and a transmission rate required by a receiver.

* * * * *